10887091B2

United States Patent
Kapp et al.

(10) Patent No.: US 10,887,091 B2
(45) Date of Patent: Jan. 5, 2021

(54) MULTI-HOP SECURITY AMPLIFICATION

(71) Applicant: BAE Systems Information and Electronic Systems Integration Inc., Nashua, NH (US)

(72) Inventors: Benjamin Kapp, San Diego, CA (US); Jibu Abraham, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 253 days.

(21) Appl. No.: 16/200,984

(22) Filed: Nov. 27, 2018

(65) Prior Publication Data
US 2020/0169391 A1    May 28, 2020

(51) Int. Cl.
H04L 29/06 (2006.01)
H04L 9/08 (2006.01)

(52) U.S. Cl.
CPC .................. H04L 9/085 (2013.01)

(58) Field of Classification Search
CPC ....................................... H04L 9/085
See application file for complete search history.

(56) References Cited

U.S. PATENT DOCUMENTS

| | | | |
|---|---|---|---|
| 5,625,692 A | 4/1997 | Herzberg et al. | |
| 6,182,214 B1 | 1/2001 | Hardjono | |
| 2009/0077379 A1 | 3/2009 | Geyzel et al. | |
| 2018/0074889 A1 | 3/2018 | Resch et al. | |
| 2019/0104206 A1* | 4/2019 | Goel | H04L 45/16 |
| 2019/0104207 A1* | 4/2019 | Goel | H04L 49/25 |
| 2020/0169513 A1* | 5/2020 | Goel | H04L 12/4633 |

OTHER PUBLICATIONS

International Search Report, PCT/US19/63533, dated Mar. 24, 2020, 13 pages.
"Mesh networking", retrieved from the Internet: https://en.wikipedia.org/wiki/Mesh_networking [copy retrieved Nov. 6, 2018], 5 pages.
"Shamir's Secret Sharing", retrieved from the Internet: https://en.wikipedia.org/wiki/Shamir%27s_Secret_Sharing [copy retrieved Nov. 6, 2018], 7 pages.

* cited by examiner

Primary Examiner — Mahfuzur Rahman
(74) Attorney, Agent, or Firm — Finch & Maloney PLLC (57) ABSTRACT

Techniques are disclosed for multi-hop security amplification. The techniques disclosed provide multi-hop security amplification by applying a secret sharing scheme to data as the data is routed within a network to an intended recipient device. In an embodiment, a sending device divides the data into shares based on a secret sharing scheme, and sends the shares to respective network nodes in a network. These network nodes then divide their respective shares into lower-level shares based on the secret sharing scheme, and route the lower-level shares to downstream network nodes for further routing to the intended recipient device. The intended recipient device receives some or all of the lower-level shares and reconstructs the data from the received lower-level shares. In an embodiment, the secret sharing scheme is a threshold-based secret sharing scheme, such as Shamir's secret sharing scheme.

20 Claims, 5 Drawing Sheets

MULTI-HOP SECURITY AMPLIFICATION

FIELD OF THE DISCLOSURE

This disclosure relates generally to data communications, and more particularly, to multi-hop security amplification for data communicated between devices over a network.

BACKGROUND

With the onset of the digital age, communication between interconnected devices over communication networks is becoming widespread. Countless times a day, devices communicate with each other to relay information. Oftentimes, the communication involves transmission of data that is sensitive to the sender and/or receiver. In such cases where the information is of a sensitive nature, encryption techniques can be employed to secure the data in such a way that only authorized parties can access the data and those who are not authorized cannot. Depending on the technical capability of a given eavesdropper, however, some encryption techniques are relatively easy to defeat.

These and other features of the present embodiments will be understood better by reading the following detailed description, taken together with the figures herein described.

DETAILED DESCRIPTION

Given the recognized importance of maintaining the security and integrity of digital data, significant resources have been devoted to developing data security technologies to resist malicious attacks and other potentially compromising events. While secure and reliable digital storage technologies have been proposed for so-called data at rest, it is important to recognize that the data should be secure not only during storage in a storage resource, but also while outside the storage resource, such as during transmission or consumption. For example, sensitive data, such as credit card information, will ideally be secured during usage at the point of sale as well as during communication of such data to a bank or clearing house. Efforts to address this concern have focused on cryptographic schemes for the security of data during consumption (so-called data in use) and transmission (so-called data in transit). Modern cryptographic schemes involve encryption techniques that transform the data into an unintelligible form during transmission in order to conceal the data from eavesdroppers. However, as noted above, some encryption techniques are relatively more vulnerable to attack or otherwise inadequate.

Thus, and in accordance with certain of the embodiments disclosed herein, techniques for multi-hop security amplification for data communication are disclosed. In accordance with various embodiments of the present disclosure, multi-hop security amplification is provided by applying a secret sharing scheme to data as the data is routed within a mesh network to its intended recipient. In an example embodiment, a threshold-based secret sharing scheme, such as Shamir's secret sharing scheme, is applied to data as the data is routed (e.g., at one or more hops in the route) within the mesh network.

A mesh network refers to a network topology in which network nodes (sometimes referred to as infrastructure nodes), such as routers, bridges, switches, gateways, and other network devices, connect directly, dynamically, and non-hierarchically to one or more nodes, and in some cases to as many other nodes as possible. These connected nodes cooperate with one another to route data being sent by a sender client to a recipient client. In such mesh networks, the data is propagated along a path by hopping from node to node until the data reaches its intended recipient. This lack of dependency on any one node allows for every node to participate in the routing (or relay) of information. Mesh networks dynamically self-organize and self-configure, which allows the network to operate in the event that a node should fail, or a connection become unreliable. Note that the ability to self-configure allows for dynamic distribution of workloads.

Secret sharing refers to a sharing scheme where an original secret is divided or otherwise transformed into shares or parts and allocating each share to a respective participant, thus causing the original secret to be distributed amongst a group of participants. The original secret can be reconstructed only when all of the shares are combined. Individual shares or less than all of the shares are of no use on their own. However, in some instances, requiring all of the shares to reconstruct the original secret may be impractical. A threshold-based secret sharing scheme, such as Shamir's secret sharing scheme, requires access to a threshold number of shares to reconstruct an original secret, and no information regarding the original secret is leaked by any subset of less than the threshold number of shares. For instance, a (k, n) threshold secret sharing scheme divides an original secret into n shares, allocates the n shares to n participants, allows the original secret to be reconstructed when at least k shares are combined, but does not allow any information regarding the original secret to be obtained with fewer than k shares. Note that if k=n, then all the shares are needed to reconstruct the original secret.

According to one example embodiment, when routing data (e.g., a message containing the data) within the mesh network, a network node can divide its data into shares in accordance with a secret sharing scheme and send (e.g., transmit) these shares to different downstream network nodes. These downstream network nodes can then each divide its particular share into sub-shares in accordance with the secret sharing scheme and send these sub-shares to different network nodes further downstream. This process (e.g., dividing a share into sub-shares and sending the sub-shares to different nodes) can be repeated at these downstream network nodes, thus causing the data to be divided into an ever-increasing number of shares (shares, sub-shares, sub-sub-shares, etc.) as the number of hops (e.g., number of times the routed data is divided into shares) increases. Since an eavesdropper needs to intercept or otherwise obtain a sufficient number of shares, sub-shares, sub-sub-shares, etc., to reconstruct the data, the eavesdropper would encounter increased difficulty the farther the eavesdropper is from the sender or receiver (with the distance between the eavesdropper and the sender or receiver being measured in hops). This is because the number of shares as well as the number of communication channels increases relative to the number of hops, thus providing multi-hop security amplification (e.g., making interception by the eavesdropper increasingly difficult). As nodes can be added at any time to a mesh network, the path or route from the sender to the intended recipient is arbitrary and dynamic. In addition, the network can be comprised of a large and in some instances a very large number of nodes. Given characteristics of highly dynamic and highly scalable, the ability for an adversary to intercept all links between all nodes (or even a sufficient amount of links between nodes) is seemingly implausible or otherwise extremely difficult.

Note that the message to be communicated originates from a sender node and is increasingly divided into shares (one round of division per each hop), and all those shares converge at an intended recipient node. Thus, a would-be eavesdropper may plausibly intercept a relatively smaller number of communications that originate from the sender node, or alternatively intercept all the communications that converge at the intended recipient node. However, such unlikely scenarios would require the eavesdropper to be in close proximity to either the sender node or the intended recipient node, as opposed to being able to intercept the communications anywhere along the network path. Thus, the various techniques disclosed herein provide enhanced data security for those locations in the network that are relatively far removed or otherwise distant from sender nodes and the intended recipient nodes, where security at these far removed, distant nodes may be otherwise difficult or impossible to provide (e.g., intermediate nodes proximate undersea cables, satellite links, channels that pass through enemy or otherwise unfriendly territory, etc.) and as such is of great practical utility.

Example use cases are instructive as to how the techniques provided herein can be employed. In one example use case, for instance, assume a sender (herein after termed 'Bob') wants to send data to an intended recipient (herein after termed 'Alice'). Bob can use a computing device (sometimes referred to herein as a "sending device") to send data to a computing device (sometimes referred to herein as an "intended recipient device') being used by or otherwise associated with Alice. The sending device can apply a first secret sharing scheme to the data prior to sending the data to the intended recipient device. In an example embodiment, the first secret sharing scheme is a (k, n) threshold secret sharing scheme. In such embodiments, the sending device divides the data into n shares such that at least k shares are needed to reconstruct the data. The sending device then sends each share to a respective network node, where each network node may be in a corresponding path to the intended recipient device. The network nodes that receive the shares from the sending device can be considered first hop network nodes. A first hop network node receiving a share checks to determine whether it is to apply a second secret sharing scheme in routing the received share to the intended recipient device or whether it is to route the received share to the intended recipient device without applying a secret sharing scheme. For instance, a hop counter or other suitable indicator can specify whether the first hop network node is to apply the second secret sharing scheme. In some embodiments, the second secret sharing scheme is the same as the first secret sharing scheme applied by the sending device. In other embodiments, the second secret sharing scheme is distinct (different) than the first secret sharing scheme. In any case, if the first hop network node determines that it is to apply the second secret sharing scheme, the first hop network node applies the second secret sharing scheme to the received share. For example, suppose the second secret sharing scheme is a (k', n') threshold secret sharing scheme. In this example case, the first hop network node divides the received share into n' sub-shares such that at least k' sub-shares are needed to reconstruct the share. The generated sub-shares can be considered first hop shares. The first hop network node can then appropriately set the value of the hop counter, and route each sub-share to a respective network node in corresponding paths to the intended recipient device. Otherwise, if the first hop network node determines that it is to not apply a secret sharing scheme, the first hop network node can route the received share to the intended recipient device. The network nodes that receive the sub-shares from the first hop network node can be considered second hop network nodes. Each downstream network node (e.g., first hop network node, second hop network node, third hop network node, etc.) in the paths from the sending device to the intended recipient device determines whether to apply a secret sharing scheme to its received share (e.g., share, sub-share, sub-sub-share, etc.). Eventually, the hop counter becomes set to zero ('0'), in which case the shares are no longer divided into subsequent (or lower-level) shares, but are instead routed to the intended recipient device. The intended recipient device can then apply, and in some instances repeatedly apply, the secret sharing scheme to reconstruct the data that the sending device wanted to send to the intended recipient device. For instance, suppose that the data is divided into sub-sub-shares during the routing of the data to the intended recipient device. In this example case, the intended recipient device can apply the secret sharing scheme to the received sub-sub-shares to reconstruct the sub-shares. Similarly, the secret sharing scheme can be applied to the sub-shares to reconstruct the shares, which can then be used to reconstruct the data. In a more general sense, the process of applying the secret sharing scheme to lower-level shares to reconstruct a higher-level share can be repeated as necessary to reconstruct the data sent by the sending device. The intended recipient device can then display or otherwise provide the received data to Alice.

Thus, the foregoing framework provides multi-hop security amplification as the data is communicated from the sending device to the intended recipient device. The multi-hop security amplification is provided by the network nodes that apply the secret sharing scheme to the data at the various hops during the routing of the data through the mesh network. The amplification can be controlled by specifying the number of hops at which the secret sharing scheme is applied to the data. Additionally or alternatively, the amplification can be controlled by specifying the parameters, such as the k parameter value and the n parameter value, for instance, of the secret sharing scheme. In some such cases, the sending node can specify the k parameter value and the n parameter value that is to be used by the network nodes in applying the secret sharing scheme. In other such cases, the network nodes can be configured to apply a pre-defined secret sharing scheme (e.g., a pre-defined k parameter value and n parameter value). The disclosed techniques improve the security and integrity of data communication by providing a secure communication capability that is increasingly difficult to intercept as a function of the distance (measured in hops) an eavesdropper is located from both the sender and the recipient of the data. These and other advantages and alternative embodiments will be apparent in light of this disclosure.

System Architecture

Figure 1:
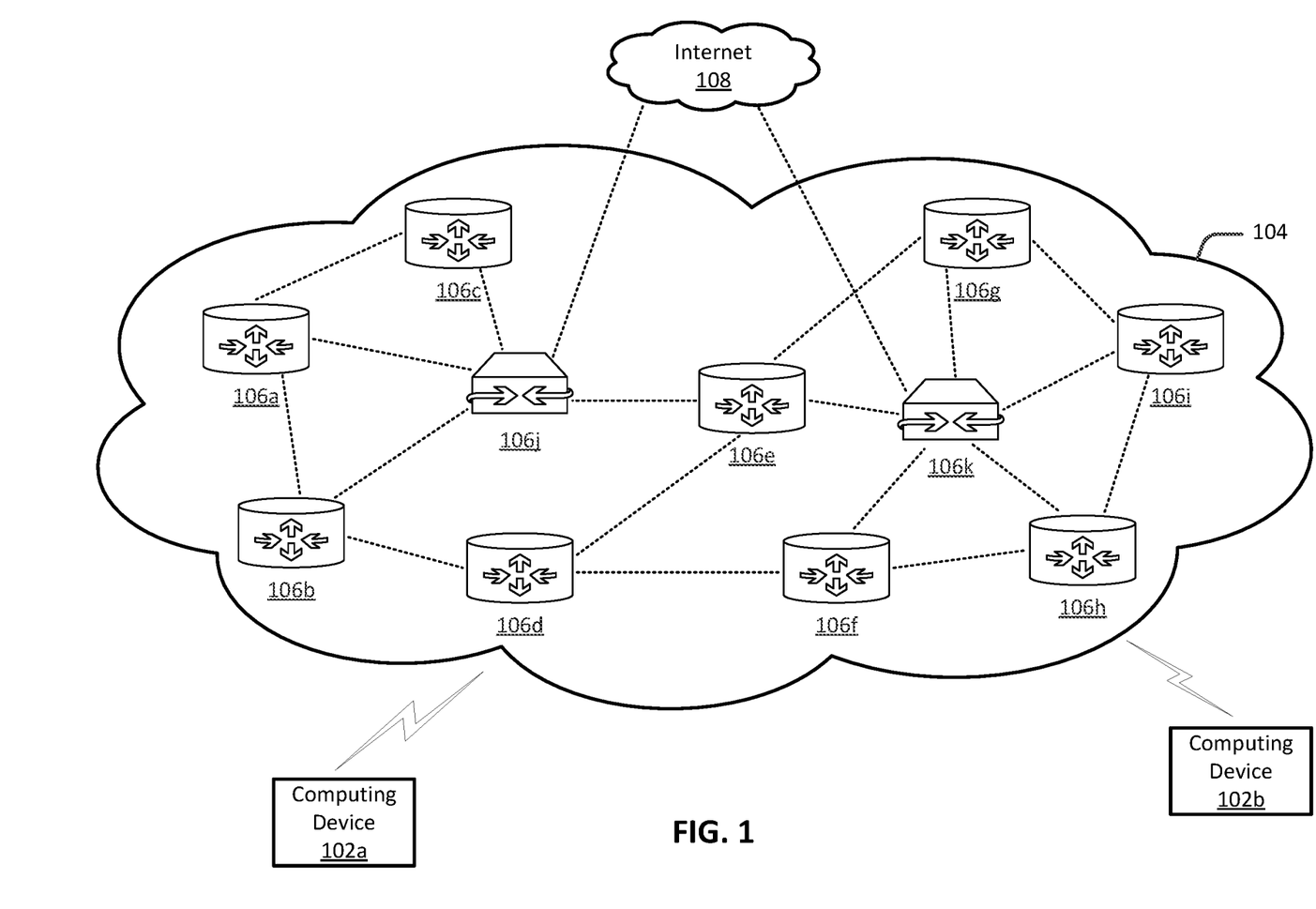
FIG. 1 is a schematic illustration of an example framework that provides multi-hop security amplification, in accordance with an embodiment of the present disclosure.

Turning now to the figures, FIG. 1 is a schematic illustration of an example framework that provides multi-hop security amplification, in accordance with an embodiment of the present disclosure. As shown, a computing device 102a and a computing device 102b (sometimes referred to herein as computing device 102 for brevity), are communicatively coupled to a mesh network 104. Generally, computing device 102 can be any type of device, such as a desktop computer, a laptop computer, a workstation, an enterprise class server computer, a handheld computer, a tablet computer, a cellular telephone, a smartphone, a set-top box, a kiosk, or any other computing device, suitable for generation and secure communication of messages over mesh network 104 as variously described herein. The number of computing devices 102 depicted in the framework illustrated in FIG. 1 is for illustration, and other example embodiments may include a different number of computing devices. That is, it should be understood that the framework illustrated in FIG. 1 is easily extended to an arbitrary number of computing devices and their associated data communications in accordance with the techniques described herein. As such, the embodiments disclosed herein are not intended to be limited to the secure communication of data between only two computing devices.

In general, mesh network 104 includes a large number, and in some instances a very large number, of connected network nodes that cooperate with one another to route data within mesh network 104 and other network nodes and networks communicatively coupled to mesh network 104. A network node can include a redistribution point or a communication endpoint in a network. Accordingly, a network node can include any component (or a collection of components) configured to provide direct, or indirect, access to a network (e.g., access nodes, base stations, etc.), any component (or a collection of components) configured to redistribute communications within a network (e.g., relays, repeaters, routers, etc.), and/or any component (or a collection of components) configured to provide ingress or egress to a network (e.g., gateways, computing devices, etc.).

As illustrated in FIG. 1, mesh network 104 includes network nodes 106a-106k (individually referred to herein as network node 106 or collectively referred to herein as network nodes 106). In the example shown, network nodes 106a-106k may each be a router, and network nodes 106j and 106k may each be a gateway. Specifically, network node 106a is connected to network nodes 106b, 106c, and 106j; network node 106b is connected to network nodes 106a, 106d, and 106j; network node 106c is connected to network nodes 106a and 106j; network node 106d is connected to network nodes 106b, 106e, and 106f; network node 106e is connected to network nodes 106d, 106g, 106j, and 106k; network node 106f is connected to network nodes 106d, 106h, and 106k; network node 106g is connected to network nodes 106e, 106i, and 106k; network node 106h is connected to network nodes 106f, 106i, and 106k; network node 106i is connected to network nodes 106g, 106h, and 106k; network node 106j is connected to network nodes 106a, 106b, 106c, and 106e, and network node 106k is connected to network nodes 106e, 106f, 106g, 106h, and 106i. Network node 106j and 106k are each connected to Internet 108. The connections between the network nodes can be wireless, wired, or a combination of both. The number and/or types of network nodes 106 depicted in mesh network 104 is for illustration, and it will be appreciated that mesh network 104 may include a different number and/or types of network nodes 106. Also, the specific examples of the connections between network nodes provided above is for illustration, and it will be appreciated that there may be any number of connections, including connections between different network nodes and different numbers of network nodes than those illustrated in the examples above. Furthermore, although illustrated as a single network, mesh network 104 can be comprised of multiple networks, both wired or wireless.

As will be described in further detail with respect to FIGS. 2-7, the framework illustrated in FIG. 1 can be understood as enabling computing devices, such as computing devices 102a and 102b, to leverage the routing characteristics of mesh network 104 in conjunction with the security characteristics of a secret sharing scheme to securely communicate with each other as variously described herein. Briefly, by way of an example and overview, a user can use computing device 102a to specify data to be sent to computing device 102b via mesh network 104. In such example embodiments, computing device 102a can generate a message that includes the data. Prior to sending the message, computing device 102a can divide the message into multiple shares and send the shares to respective network nodes 106. As the shares are routed within mesh network 104 to computing device 102b, each of the multiple shares may be divided into further sub-shares at each hop in the routing, as appropriate. All or a subset of the shares, sub-shares, etc., are received by computing device 102b, where the message sent (i.e., the message intended to be sent) by computing device 102a can be reconstructed from the received shares, sub-shares, etc.

Figure 2:
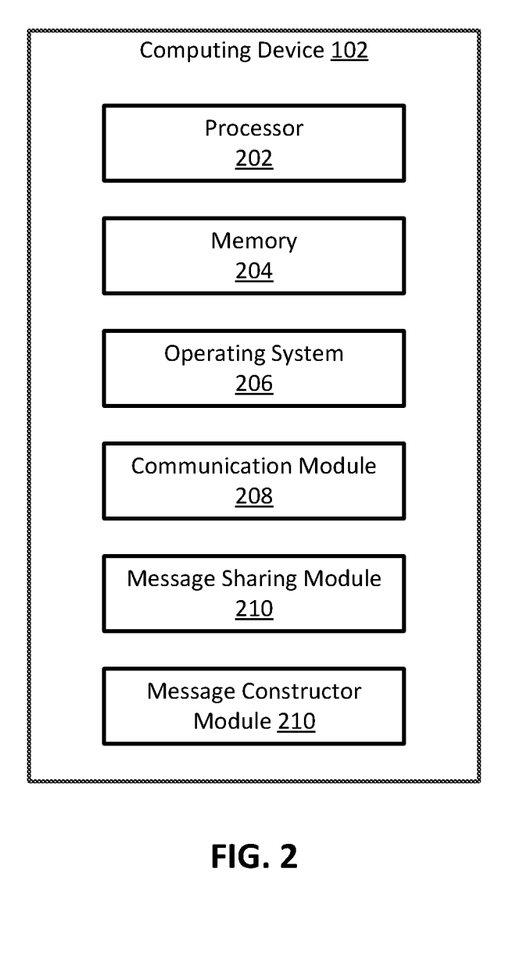
FIG. 2 is a block diagram illustrating selected components of an example computing device, in accordance with an embodiment of the present disclosure.

FIG. 2 is a block diagram illustrating selected components of example computing device 102, in accordance with an embodiment of the present disclosure. As shown, computing device 102 includes a processor 202, a memory 204, an operating system 206, a communication module 208, a message sharing module 210, and a message constructor module 212. Computing device 102 also optionally includes input/output components such as one or more of a tactile keyboard, a display, a touch sensitive display, a microphone, a camera, and location services. Such input/output components allow users of computing device 102 to control operation of computing device 102.

Processor 202 can be any suitable processor, such as a reduced instruction set computer (RISC) processor or a complex instruction set computer (CISC) processor. Processor 202 may include one or more coprocessors or controllers, such as an audio processor or a graphics processing unit, to assist in processing operations associated with network node 108. Memory 204 can be implemented using any suitable type of digital storage, such as one or more of a disk drive, a redundant array of independent disks (RAID), a universal serial bus (USB) drive, flash memory, random access memory (RAM), or any suitable combination of the foregoing. In some implementations, memory 204 may include non-transitory computer-readable media such as, but not limited to, one or more types of hardware memory, non-transitory tangible media (for example, one or more magnetic disks, one or more optical disks, one or more USB flash drives), and the like. Memory 204 may store computer-readable and computer-executable instructions or software, such as message generator module 210 and/or message constructor module 212, for implementing the various embodiments as disclosed herein. Operating system 206 may comprise any suitable networking operating system, such as UNIX®, LINUX®, MICROSOFT® WINDOWS® (Microsoft Crop., Redmond, Wash.), GOOGLE® ANDROID™ (Google Inc., Mountain View, Calif.), APPLE® iOS (Apple Inc., Cupertino, Calif.), or APPLE® OS X° (Apple Inc., Cupertino, Calif.). As will be appreciated in light of this disclosure, the techniques provided herein can be implemented without regard to the particular operating system provided in conjunction with computing device 102, and therefore may also be implemented using any suitable existing or subsequently developed platform. Communication module 208 can be any appropriate network chip or chipset which allows for wired or wireless communication via network 106 to one or more of the other components described herein. Communication module 208 can also be configured to provide intra-device communications via a bus or an interconnect. Communication module 112a, 112b can also be configured to provide intra-device communications via a bus or an interconnect.

Message sharing module 210 is configured to divide a message into shares based on a secret sharing scheme. In some embodiments, message sharing module 210 divides a message into shares based on a (k, n) threshold secret sharing scheme. As described previously, applying a (k, n) threshold secret sharing scheme to a message generates n shares such that at least k shares are needed to reconstruct the message. The values of the secret sharing scheme threshold parameters k and n may be set to a suitable value, such as (3, 5), (4, 6), (5, 7), or any other suitable combination of values. In an embodiment, n and k are integers, and n≥2k−1.

In some embodiments, the values of the parameters k and n may be tunable based on a desired performance. These parameter values can be increased or "dialed up" (or decreased or "dialed down") to increase (or decrease) performance attributes such as confidentiality, availability, and bandwidth utilization. For instance, a larger value of k corresponds to an increase in confidentiality since the larger reconstruction threshold k means more shares are needed to reconstruct the message. Since more shares are needed to reconstruct the message, the message is more confidential because it is harder to determine the message. With respect to the parameter n, a larger value of n corresponds to an increase in availability since the larger n means there are more shares. Assuming the reconstruction threshold k is kept constant, increasing the number of shares results in an increase in likelihood that the message can be reconstructed because more of the shares can be lost. Note that larger values of k and n result in an increase in bandwidth utilization since more data needs to be moved through the network in sending a message.

Message sharing module 210 assigns or otherwise associates with each share a unique identifier. In an example embodiment, the unique identifier includes a parent identifier ('ParentID') component and a part identifier ('PartID') component. The ParentID denotes or identifies the parent (e.g., where the share came from), and the PartID denotes or identifies the specific part generated (e.g., share) by the parent. For example, suppose a message A is divided into three shares, share X, share Y, and share Z. In this example, share X can be associated with a unique identifier 'A1', share Y can be associated with a unique identifier 'A2', and share Z can be associated with a unique identifier 'A3'. The ParentID component (e.g., 'A') of the unique identifier denotes the parent (e.g., message A) that can be reconstructed by combining a sufficient number of shares (parts) generated from dividing message A (e.g., 'A1', 'A2', and 'A3').

Note that the shares generated from a message may be repeatedly divided into lower-level shares or sub-shares to generate a large number, and in some instances a very large number, of sub-shares during the routing of the shares to an intended recipient device. In order for an intended recipient device to reconstruct higher-level shares from the potentially large numbers of lower-level shares, the intended recipient device needs to know which low-level shares to combine to reconstruct a next higher-level share. The unique identifier (parent identifier and share identifier) discussed previously makes this determination possible. In some embodiments, a unique identifier is assigned to or otherwise associated with each lower-level share (e.g., sub-share, sub-sub-share, etc.) generated by a network node.

Message sharing module 210 then sends the generated shares, instead of the message itself, to network nodes, such as network nodes 106, to be routed to an intended recipient of the message. In an embodiment, each share is sent to a different network node. In other embodiments, multiple shares may be sent to the same network node. In some embodiments, message sharing module 210 is configured to specify a value for a hop counter ('HopCounter') parameter. The hop counter parameter specifies the number of hops in the routing at which network nodes are to divide a share into sub-shares in the instance of shares, divide a sub-share into sub-sub-shares in the instance of sub-shares, and so on. In a general sense, the value of the hop counter parameter indicates the number of times a secret sharing scheme is to be applied during the routing of a message. The value of the hop counter parameter may be set to a suitable value, such as 2, 3, 4, or any other suitable value. In some embodiments, the value of the hop counter parameter may be tunable based on a desired performance. Similar to the values of the parameters k and n discussed previously, this value can be increased or "dialed up" (or decreased or "dialed down") to increase (or decrease) performance attributes such as confidentiality, availability, and bandwidth utilization.

In some embodiments, message sharing module 210 specifies the secret sharing scheme that is to be applied by the downstream network nodes. For example, in the case of a threshold-based network sharing scheme, message sharing module 210 can specify values of the k parameter and the n parameter, and send or otherwise provide these values to the downstream network nodes.

Message constructor module 212 is configured to reconstruct the message from the lower-level shares. Message constructor module 212 can apply the secret sharing scheme to the received lower-level shares to reconstruct the message. For instance, in some embodiments, message constructor module 212 determines the lowest-level shares that can be combined, and combines these lowest-level shares to reconstruct a next higher-level share. Having reconstructed the next-higher level shares in this manner, message constructor module 212 determines the next-higher level shares that can be combined, and combines these next-higher level shares to reconstruct a subsequent higher-level share. Message constructor module 212 repeats this process as necessary to reconstruct the message from the received lower-level shares level-by-level.

As will be further appreciated in light of this disclosure, note that one or both of message sharing module 210 and message constructor module 212 can be included in or otherwise provided as a stand-alone application in some embodiments, while in other embodiments may be integrated with another application program and/or service. For instance, in an example embodiment, the various functionalities of message sharing module 210 and/or message constructor module 212 can be integrated into an operating system, such as operating system 206, and provided as part of the operating system services. In other embodiments, one or both of message sharing module 210 and message constructor module 212 can be integrated with other applications and/or services such as email applications, messaging applications, file transfer applications, financial applications, or other suitable applications that provide or use data communication capabilities.

In various embodiments, additional components or a subset of the illustrated components can be employed without deviating from the scope of the present disclosure. For instance, other embodiments may integrate the various functionalities of the message sharing module and the message constructor module into fewer modules (e.g., one) or more modules (e.g., three, four or five, or more). In addition, further note that one or both of the message sharing module and the message constructor module may be downloaded from a server computing system onto the computing device for local execution. In some cases, the functionality provided by of one or both of the message sharing module and the message constructor module may be provided on a server computing system communicatively coupled to the computing device. In a more general sense, the degree of integration and distribution of the functional component(s) provided herein can vary greatly from one embodiment to the next, as will be appreciated in light of this disclosure.

Figure 3:
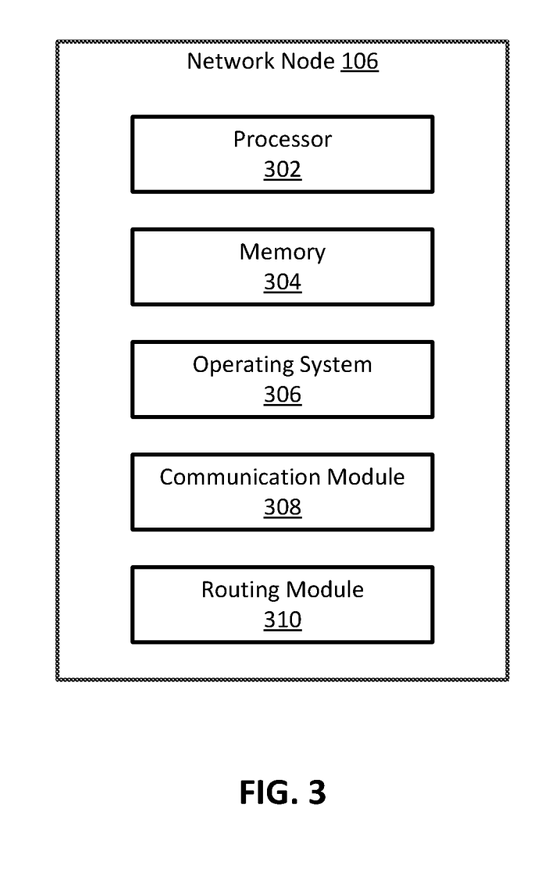
FIG. 3 is a block diagram illustrating selected components of an example network node, in accordance with an embodiment of the present disclosure.

FIG. 3 is a block diagram illustrating selected components of example network node 106, in accordance with an embodiment of the present disclosure. As shown, network node 106 includes a processor 302, a memory 304, an operating system 306, a communication module 308, and a routing module 310. In various embodiments, additional components or a subset of the illustrated components can be employed without deviating from the scope of the present disclosure.

Processor 302 can be any suitable processor, such as a reduced instruction set computer (RISC) processor or a complex instruction set computer (CISC) processor. Processor 302 may include one or more coprocessors or controllers to assist in processing operations associated with network node 106. Memory 304 can be implemented using any suitable type of digital storage, such as one or more of a read-only memory (ROM), flash memory, random access memory (RAM), non-volatile random access memory (NVRAM), or any suitable combination of the foregoing. In some implementations, memory 304 may include one or more non-transitory computer-readable media. Memory 304 may store computer-readable and computer-executable instructions or software, such as routing module 310, for implementing the various embodiments as disclosed herein. Operating system 306 may comprise any suitable networking operating system, such as an Internetwork Operating System (IOS). In some implementations, operating system 306 may comprise any operating system suitable for implementation on network nodes. As will be appreciated in light of this disclosure, the techniques provided herein can be implemented without regard to the particular operating system provided in conjunction with network node 106, and therefore may also be implemented using any suitable existing or subsequently developed platform. Communication module 308 can be any appropriate network chip or chipset which allows for wired or wireless communication via network 106 to one or more of the other components described herein. Communication module 208 can also be configured to provide intra-device communications via a bus or an interconnect.

Routing module 310 is generally configured to determine whether (or not) to apply a secret sharing scheme to a received message prior to routing the message downstream to the intended recipient, and to apply the secret sharing scheme to the message based on the determination. Note that the received message can be a share or a lower-level share (e.g., sub-share, sub-sub-share, etc.) depending on the hop level at which the message is received. In some embodiments, routing module 310 determines whether to apply the secret sharing scheme from the value of the hop counter parameter associated with the received message. For instance, the hop counter parameter value can be received or otherwise provided with the received message. If a secret sharing scheme is to be applied, routing module 310 applies the secret sharing scheme to the received message and appropriately sets the value of the hop counter parameter. In some embodiments, routing module 310 divides the received message into shares based on a (k, n) threshold secret sharing scheme. The values of the secret sharing scheme threshold parameters k and n can be received or otherwise provided with the received message. In other embodiments, routing module 310 can use pre-defined values for the secret sharing scheme threshold parameters k and n. In any such cases, routing module 310 assigns or otherwise associates with each generated share a unique identifier that includes a ParentID component and a PartID component, as described previously. Routing module 310 then routes the generated shares to respective downstream network nodes, such as downstream network nodes 106, for further routing to the intended recipient device.

In some embodiments, routing module 310 is configured to ensure that a downstream network node that receives a share is not (i.e., is distinct from) the network node from which the message is received. Ensuring that the downstream network node is different from the network node from which the message is received prevents tight loops in the routing of the lower-level shares (e.g., where children network nodes and parent network nodes repeatedly send lower-level shares back-and-forth).

Figure 4:
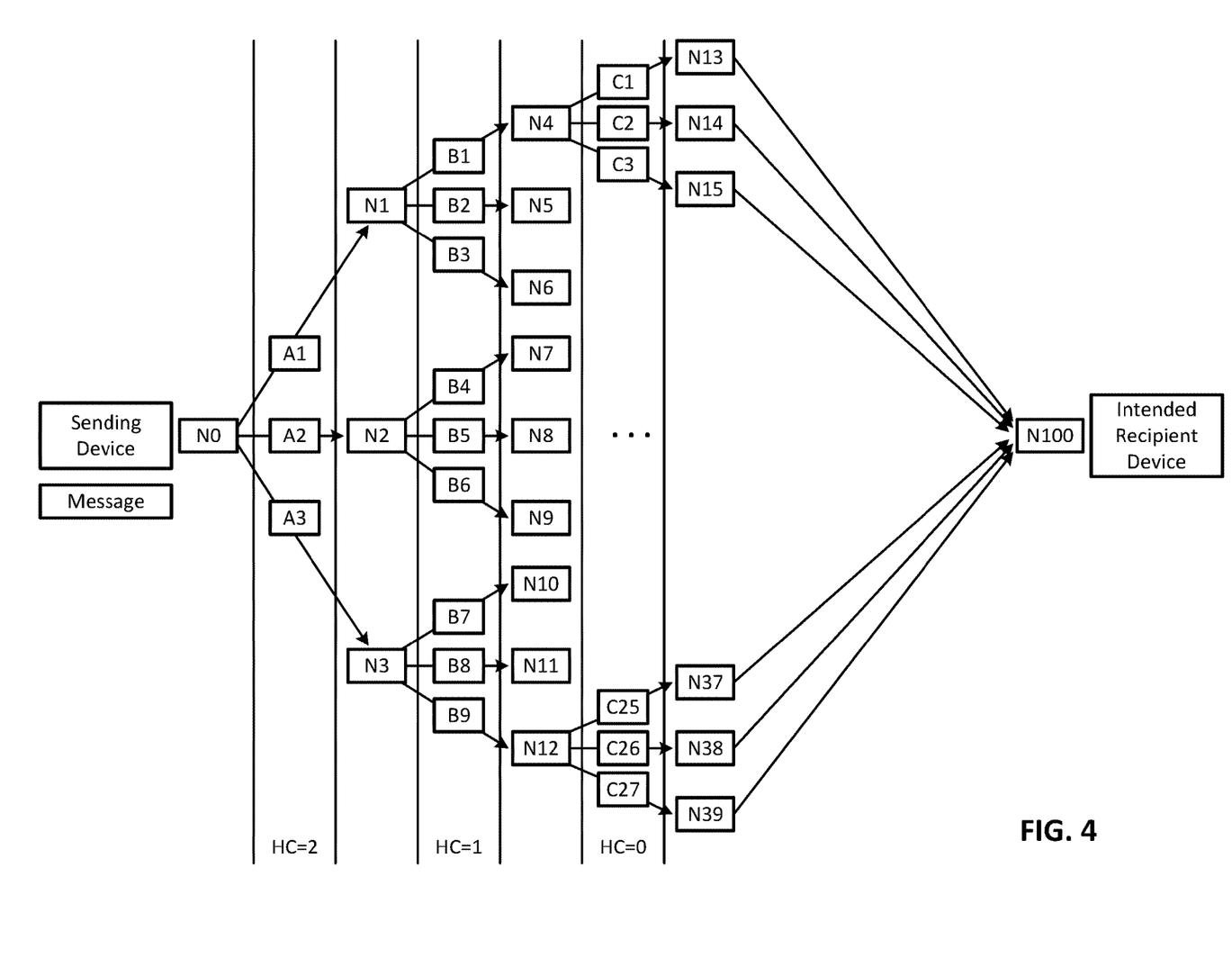
FIG. 4 illustrates example routing of data from a sending device to an intended recipient device, in accordance with an embodiment of the present disclosure.

FIG. 4 illustrates example routing of data from a sending device to an intended recipient device, in accordance with an embodiment of the present disclosure. The illustrated example in FIG. 4 assumes application of a (2, 3) threshold secret sharing scheme at each hop in the routing of the message. However, it will be appreciated in light of this disclosure that the threshold secret sharing scheme can be readily extended to other n parameter values and/or reconstruction threshold k parameter values. It will also be appreciated in light of this disclosure that the same threshold secret sharing scheme need not be applied at the various hops in the routing of the message. For instance, a first secret sharing scheme can be applied at a first hop, and a second secret sharing scheme can be applied at a second hop. Furthermore, network nodes at the same hop level can apply different network sharing schemes. The illustrated example in FIG. 4 also assumes a hop counter parameter value of three ('3'). However, it will be appreciated in light of this disclosure that the hop counter parameter value need not be so limited but, rather can be extended to any suitable value.

As illustrated in FIG. 4, a sending device N0 is sending a message to an intended recipient device N100. In an example use case and embodiment, a user may be using sending device N0 to make an online transaction with a retail website hosted on intended recipient device N100. In the course of making the online transaction, the user may provide personal information as requested by the retail website. The provided information can be encrypted and included in the message for sending to intended recipient device N100. Prior to or as part of sending the message, sending device N0 can determine that a (2, 3) threshold secret sharing scheme is to be applied to the message. In response to this determination, sending device N0 can apply the (2, 3) threshold secret sharing scheme to divide the message into three shares A1, A2, and A3.

For example, suppose the (2, 3) threshold secret sharing scheme is Shamir's Secret Sharing Scheme or method. Also suppose that the message is 'S' (e.g., the message encoded as a sequence of hexadecimal numbers). Shamir's Secret Sharing Scheme is premised on the fact that two points are sufficient to define a line, three points are sufficient to define a parabola, four points are sufficient to define a cubic curve, and so on. In a more general sense, knowing N different points is sufficient to recover (reconstruct) a polynomial of the order of N−1. In the example case above, since 2 shares are sufficient to reconstruct the message, a polynomial of the order of 2−1=1 degree can be used to generate the shares. A polynomial of 1 degree is a line, which requires two points to define. Continuing the above example, to divide the message S into shares such that 2 shares are sufficient to reconstruct the message S, a y-intercept point (0, S) can be used as one point, and a second point (X, Y) may be randomly generated. The values of X and Y may be randomly generated, for instance, using a random number generator. The first point (0, S) and the second point (X, Y) can be used to define a line on the Cartesian plane. Any three points on the defined line (e.g., (X1, Y1), (X2, Y2), and (X3, Y3)) can then be selected as the three shares A1, A2, and A3. Note that for a reconstruction threshold value k, a polynomial f(x) of the order k−1 can be defined using f(0) and k−1 randomly selected points. Here, f(0) can be used as the message (e.g., secret). Then, to divide the message into n shares, any n points on the defined polynomial f(x) (excluding f(0) since this is the message) can be selected as the shares. For example, to divide the message into four shares, any four points on the defined polynomial f(x) (excluding f(0)) can be selected as the shares. The defined polynomial f(x) used to divide the message (e.g., secret) can then be determined from the threshold number of shares and used to reconstruct the message f(0).

Sending device N0 can assign a unique identifier to each of the three shares. For example, an identifier 'N0A1' can be assigned to share A1, an identifier 'N0A2' can be assigned to share A2, and an identifier 'N0A3' can be assigned to share A3. Sending device N0 can also determine that the secret sharing scheme is to be applied two additional times (e.g., at the first two hops) during the routing of the message, for a total of three times. In response to this determination, sending device N0 can set a hop counter parameter value to two ('2'). Then, to send the message to intended recipient device N100, sending device N0 sends the three shares A1, A2, and A3, to three network nodes. For example, share A1 can be sent to a network node N1, share A2 can be sent to a network node N2, and share A3 can be sent to a network node N3. Sending device N0 can also provide network nodes N1, N2, and N3, the unique identifier associated with the share received by the respective network node, the hop counter parameter value, and the threshold secret sharing scheme k parameter and n parameter values three ('2') and two ('3').

Network node N1 is a first hop network node that is in a path from sending device N0 to intended recipient device N100. Network node N1 can determine from the value of the hop counter parameter (e.g., value=2) that it is to apply a secret sharing scheme to the received share A1. Network node N1 can also determine from the k parameter and n parameter values that it is to apply a (2, 3) threshold secret sharing scheme. In response to these determinations, network node N1 can decrement the hop counter parameter value (e.g., from two ('2') to one ('1')) and apply the (2, 3) threshold secret sharing scheme to divide share A1 into three sub-shares B1, B2, and B3. Network node N1 can assign a unique identifier to each of the three sub-shares. In some embodiments, the sub-share unique identifier is appended to the higher-level (e.g., share) unique identifier. That is, the higher-level share unique identifier is maintained in or as part of each of the lower-level share identifiers. For example, an identifier 'N0A1N1B1' can be assigned to sub-share B1, an identifier 'N0A1N1B2' can be assigned to sub-share B2, and an identifier 'N0A1N1B3' can be assigned to sub-share B3. Then, to send share A1 to intended recipient device N100, network node N1 routes the three sub-shares B1, B2, and B3, to three downstream network nodes. For example, sub-share B1 can be sent to a network node N4, sub-share B2 can be sent to a network node N5, and sub-share B3 can be sent to a network node N6. Network node N1 can also provide network nodes N4, N5, and N6, the unique identifier associated with the sub-share received by the respective network node, the hop counter parameter value, and the threshold secret sharing scheme k parameter and n parameter values three ('2') and two ('3').

Similar to the processing performed by first hop network node N1, first hop network node N2 and first hop network node N3 can process the received shares to generate sub-shares, and route the generated sub-shares to respective downstream network nodes. Specifically, network node N2 can decrement the hop counter parameter value; divide share A2 into three sub-shares B4, B5, and B6; assign unique identifiers 'N0A2N2B4', 'N0A2N2B5', and 'N0A2N2B6' to sub-shares B4, B5, and B6, respectively; and send these sub-shares B4, B5, and B6 to network nodes N7, N8, and N9, respectively. Network node N2 can also provide network nodes N7, N8, and N9, the unique identifier associated with the sub-share received by the respective network node, the hop counter parameter value, and the threshold secret sharing scheme k parameter and n parameter values three ('2') and two ('3'). Similarly, network node N3 can decrement the hop counter parameter value; divide share A3 into three sub-shares B7, B8, and B9; assign unique identifiers 'N0A3N3B7', 'N0A3N3B8', and 'N0A3N3B9' to sub-shares B7, B8, and B9, respectively; and send these sub-shares B7, B8, and B9 to network nodes N10, N11, and N12, respectively. Network node N3 can also provide network nodes N10, N11, and N12, the unique identifier associated with the sub-share received by the respective network node, the hop counter parameter value, and the threshold secret sharing scheme k parameter and n parameter values three ('2') and two ('3').

Network node N4 is a second hop network node that is in the path from sending device N0 to intended recipient device N100 that includes network node N1. Network node N4 is downstream from network node N1, and is the second hop in the routing of the message to intended recipient device N100. Network node N4 can determine from the value of the hop counter parameter (e.g., value=1) that it is to apply a secret sharing scheme to the received sub-share B1. Network node N4 can also determine from the k parameter and n parameter values that it is to apply a (2, 3) threshold secret sharing scheme. In response to these determinations, network node N4 can decrement the hop counter parameter value (e.g., from one ('1') to zero ('0')) and apply the (2, 3) threshold secret sharing scheme to divide sub-share B1 into three sub-shares C1, C2, and C3. Network node N4 can assign a unique identifier to each of the three sub-sub-shares. In some embodiments, the sub-sub-share unique identifier is appended to the higher-level (e.g., sub-share) unique identifier. For example, an identifier 'N0A1N1B1N4C1' can be assigned to sub-sub-share C1, an identifier 'N0A1N1B1N4C2' can be assigned to sub-sub-share C2, and an identifier 'N0A1N1B1N4C3' can be assigned to sub-sub-share C3. Then, to send sub-share B1 to intended recipient device N100, network node N4 routes these three sub-sub-shares C1, C2, and C3, to three downstream network nodes. For example, sub-sub-share C1 can be sent to a network node N13, sub-sub-share C2 can be sent to a network node N14, and sub-sub-share C3 can be sent to a network node N15. Network node N4 can also provide network nodes N13, N14, and N15, the unique identifier associated with the sub-sub-share received by the respective network node, the hop counter parameter value, and the threshold secret sharing scheme k parameter and n parameter values three ('2') and two ('3').

Similar to the processing performed by second hop network node N4, second hop network nodes N5-N12 can each process the received sub-shares to generate sub-sub-shares, and route the generated sub-sub-shares to respective downstream network nodes. Taking network node N12 as a representative example of the processing performed by second hop network nodes N5-N12, network node N2 can decrement the hop counter parameter value; divide sub-share B3 into three sub-sub-shares C25, C26, and C27; assign unique identifiers 'N0A3N3B9N12C25', 'N0A3N3B9N12C26', and 'N0A3N3B9N12C27' to sub-sub-shares C25, C26, and C27, respectively; and send these sub-sub-shares C25, C26, and C27 to network nodes N37, N39, and N39, respectively. Network node N12 can also provide network nodes N37, N38, and N39, the unique identifier associated with the sub-sub-share received by the respective network node, the hop counter parameter value, and the threshold secret sharing scheme k parameter and n parameter values three ('2') and two ('3').

Network node N13 is a third hop network node that is in the path from sending device N0 to intended recipient device N100 that includes network nodes N1 and N4. Network node N13 is downstream from network node N4, and is the third hop in the routing of the message to intended recipient device N100. Network node N13 can determine from the value of the hop counter parameter (e.g., value=0) that it is not to apply a secret sharing scheme to the received sub-sub-share C1 identified by identifier 'N0A1N1B1N4C1'. Based on this determination, network node N13 routes the received sub-sub-share C1 identified by identifier 'N0A1N1B1N4C1' further downstream on its way to intended recipient device N100. Similar to the processing performed by third hop network node N13, third hop network nodes N14-N39 can each route its received sub-sub-share further downstream on its way to intended recipient device N100.

Intended recipient device N100 receives the sub-sub-shares sent by network nodes N13-N39. Note that in some instances, intended recipient device N100 may not receive all the sub-sub-shares sent by network nodes N13-N39. For example, a subset of these sub-sub-shares may be lost during transmission due to bad connections, etc. In another example, a network node that is upstream from any one of network nodes N13-N39 may route its share or sub-share to intended recipient device N100 without reaching the third hop in the routing, for instance. In any such cases, intended recipient device N100 reconstructs the message (i.e., the message intended to be sent by the sending device) from the lower-level shares. In some embodiments, intended recipient device N100 reconstructs the message level-by-level starting with the lowest-level shares.

Figure 5:
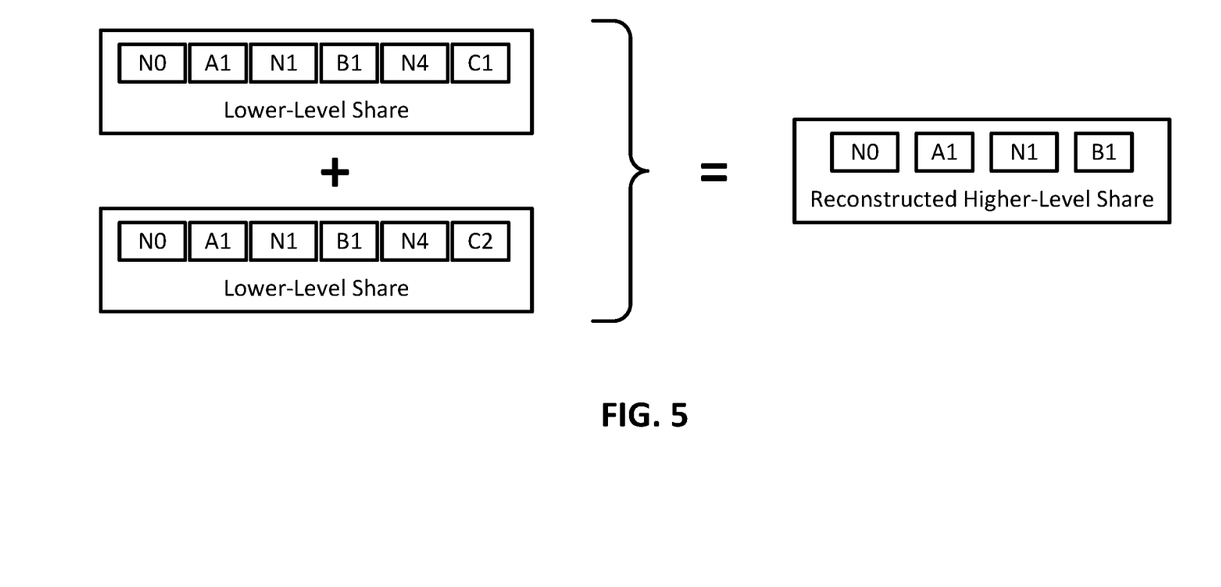
FIG. 5 illustrates an example combining of multiple lower-level shares to reconstruct a higher-level share, in accordance with an embodiment of the present disclosure.
Figure 6:
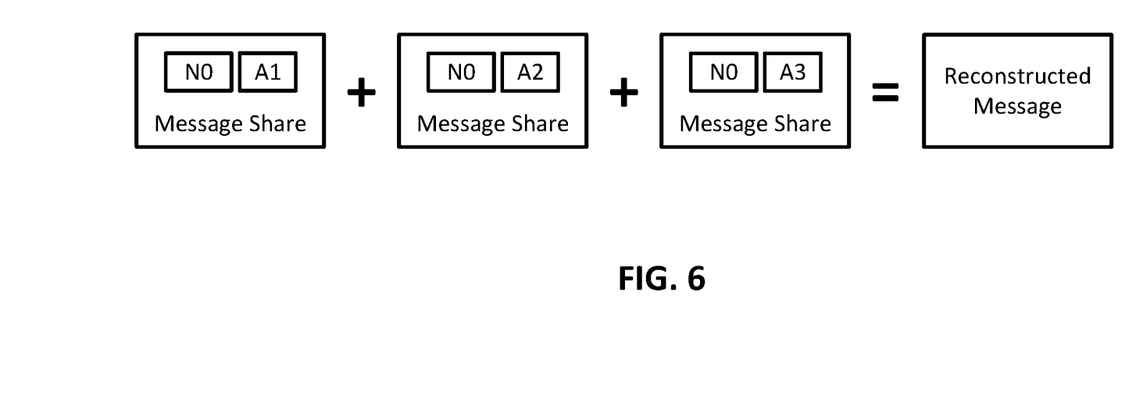
FIG. 6 illustrates an example combining of multiple shares to reconstruct a message, in accordance with an embodiment of the present disclosure.

Continuing the example above, intended recipient device N100 may determine that the lowest-level shares received are the sub-sub-shares. Intended recipient device N100 may also determine the received sub-sub-shares that can be combined to reconstruct a higher-level share. For example, as shown in FIG. 5, intended recipient device N100 can determine that sub-sub-shares identified by the unique identifiers 'N0A1N1B1N4C1' and 'N0A1N1B1N4C2' can be combined to reconstruct a higher-level share (e.g., sub-share). This determination can be made based on the ParentID component ('N4') of the unique identifiers generated for these sub-sub-shares ('N4C1' and 'N4C2'). Note that in this example case, intended recipient device N100 may not have received the other sub-sub-share generated by network node N4 (i.e., sub-sub-share identified by 'N0A1N1B1N4C3'). Continuing the example and as shown in FIG. 5, intended recipient device N100 can combine the sub-sub-shares identified by 'N0A1N1B1N4C1' and 'N0A1N1B1N4C2' to reconstruct a sub-share identified by the unique identifier 'N0A1N1B1'. Note that this reconstruction is possible by the (2, 3) threshold secret sharing scheme applied by network node N4 to generate the sub-sub-shares. Specifically, network node N4 applied the (2, 3) threshold secret sharing scheme to sub-share identified by 'N0A1N1B1' to generate the sub-sub-shares identified by 'N0A1N1B1N4C1' and 'N0A1N1B1N4C2'. Intended recipient device N100 can repeat this process to reconstruct the other sub-shares layer-by-layer, until the shares are reconstructed. Continuing the example, as shown in FIG. 6, intended recipient device N100 can reconstruct shares identified by unique identifiers 'N0A1', 'N0A2', and 'N0A3'. Having reconstructed these shares, intended recipient device N100 can combine these shares to reconstruct the message. Note that this reconstruction is possible by the (2, 3) threshold secret sharing scheme applied by sending device N0 to generate the shares. Also note that intended recipient device N100 need only combine any two of the three shares to reconstruct the message. Having reconstructed the message, intended recipient device N100 can use the data from the reconstructed message to further process the user's online transaction.

Methodology

Figure 7:
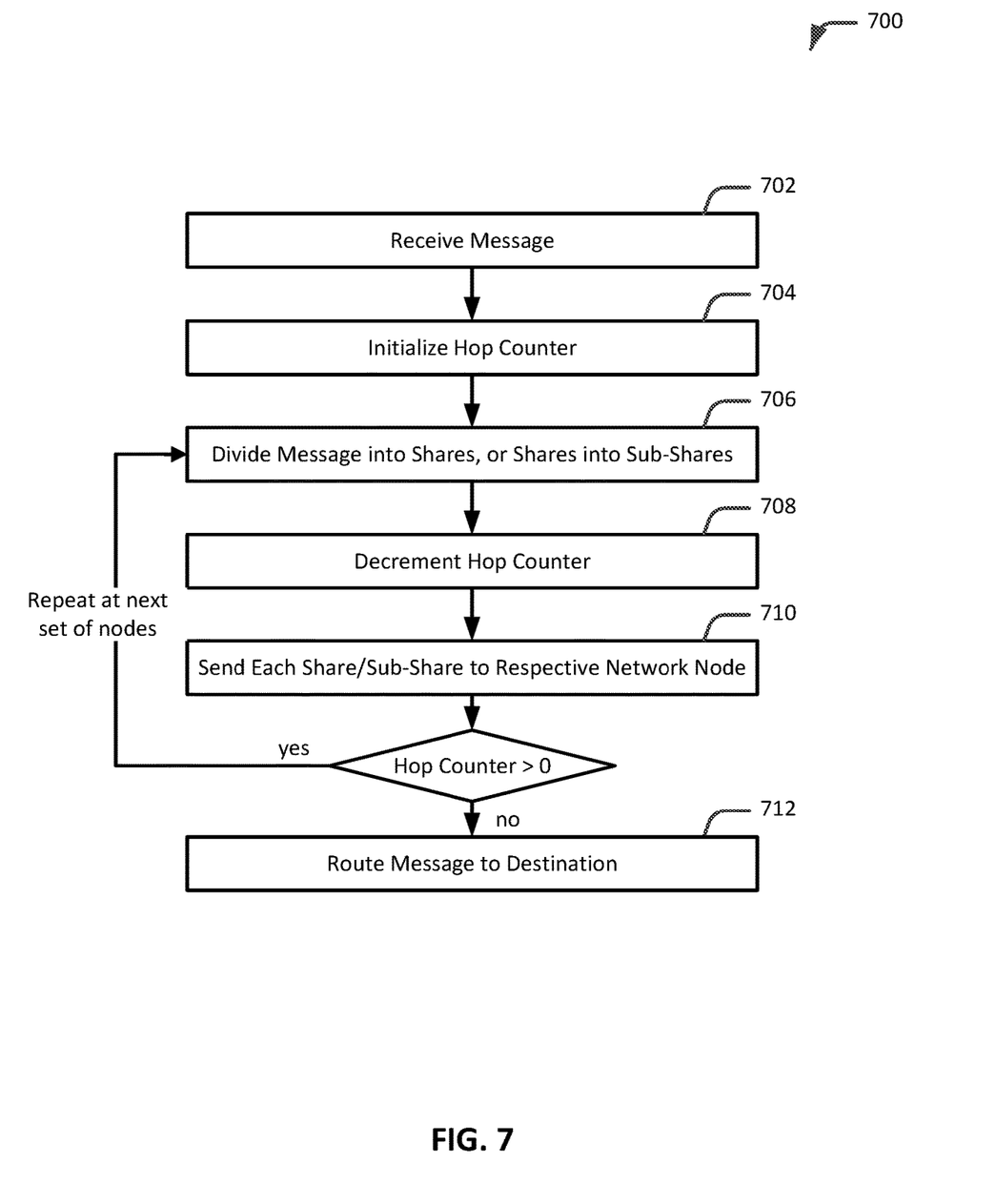
FIG. 7 is a flow diagram illustrating an example process for applying a secret sharing scheme at a network node, in accordance with an embodiment of the present disclosure.

FIG. 7 is a flow diagram illustrating an example process 700 for applying a secret sharing scheme at a network node, in accordance with an embodiment of the present disclosure. Process 700 may be performed by network nodes routing a message through a mesh network to an intended recipient. The operations, functions, or actions illustrated in example process 700 may in some embodiments be performed by various components of computing device 102 and network nodes 106 of FIG. 1. The operations, functions, or actions described in the respective blocks of example process 700 may also be stored as computer-executable instructions in a computer-readable medium, such as memory 204 of computing device 102 and memory 304 of network nodes 106.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments. To this end, each of the example processes depicted is provided to give one example embodiment and is not intended to limit the process to any particular physical or structural configuration.

With reference to FIG. 7, process 700 commences, at operation 702, by a computing device receiving a message to send to an intended recipient device. At operation 704, the sending device initializes a hop counter to an initial value, such as 2, 3, 4, or any other suitable value. The initial value of the hop counter determines the number of times the message is divided into parts during the sending of the message to the intended recipient device. At operation 706, the computing device divides the received message into shares based on a pre-defined secret sharing scheme. The applied secret sharing scheme indicates the number of shares to generate from the message. In some embodiments, the secret sharing scheme is a threshold-based secret sharing scheme. The computing device assigns to or otherwise associates with each share a unique identifier suitable for use in reconstructing the message from which the shares are generated. At operation 708, the computing device decrements the hop counter, for example, by a digit '1', to indicate application of the secret sharing scheme to divide the message into shares. At operation 710, the computing device sends each share to a respective network node in a mesh network.

Each network node that receives a share checks the value of the hop counter to determine whether (or not) to apply a secret sharing scheme to its particular share. For instance, the hop counter parameter may be provided with the received share, and a hop counter value greater than zero ('0') can be an indication to apply the secret sharing scheme to divide the share into sub-shares. If a network node determines that the secret sharing scheme is to be applied, then, at operation 706, the network node divides its particular share into sub-shares based on the applied secret sharing scheme. In some embodiments, the specific secret sharing scheme to apply may be denoted or otherwise provided with the received share. In other embodiments, the network node can apply a pre-defined secret sharing scheme. In any case, the network node assigns to or otherwise associates with each sub-share a unique identifier suitable for use in reconstructing the share from which the sub-shares are generated.

Next, at operation 708, the network node decrements the hop counter to indicate application of the secret sharing scheme to divide the share into sub-shares. Then, at operation 710, the network node sends each sub-share generated from its particular share to a respective downstream network node for continued routing to the intended recipient device. Otherwise, if the network node determines that the secret sharing scheme is to be applied, then, at operation 706, the network node sends its particular share to a downstream network node for continued routing to the intended recipient device. Operations 706-712 are repeated by each downstream network node that receives a part (e.g., share, sub-share, sub-sub-share, etc.) of the message to facilitate sending of the message to the intended recipient device.

FURTHER EXAMPLE EMBODIMENTS

The following examples pertain to further embodiments, from which numerous permutations and configurations will be apparent.

Example 1 includes a computer program product including one or more non-transitory machine-readable mediums encoding instructions that when executed by one or more processors cause a process to be carried out for routing a message, the process including: receiving a message to be sent to an intended recipient device; generating a plurality of shares based on the message, each share representing part of the message, the plurality of shares being based on a first secret sharing scheme applied to the message, the first secret sharing scheme indicating the number of shares generated; and causing transmission of the plurality of shares to respective network nodes, such that a first network node generates a plurality of first sub-shares based on a second secret sharing scheme applied to a first share, and a second network node generates a plurality of second sub-shares based on a third secret sharing scheme applied to a second share, the plurality of first sub-shares and second sub-shares being routed downstream toward the intended recipient device.

Example 2 includes the subject matter of Example 1, wherein the first secret sharing scheme is a (k, n) threshold secret sharing scheme.

Example 3 includes the subject matter of Example 2, wherein n≥k, k≥2, and n and k are positive integers.

Example 4 includes the subject matter of any of Examples 1 through 3, wherein the first secret sharing scheme, the second secret sharing scheme, and the third secret sharing scheme are the same.

Example 5 includes the subject matter of any of Examples 1 through 3, wherein the first secret sharing scheme is different than the second secret sharing scheme and the third secret sharing scheme.

Example 6 includes the subject matter of any of Examples 1 through 3, the second secret sharing scheme is different than the third secret sharing scheme.

Example 7 includes the subject matter of Example 1, wherein the first secret sharing scheme is a first threshold-based secret sharing scheme and further indicates a threshold number of shares needed to reconstruct the message, the second secret sharing scheme is a second threshold-based secret sharing scheme and further indicates a threshold number of first sub-shares needed to reconstruct the first share, and the third secret sharing scheme is a third threshold-based secret sharing scheme and further indicates a threshold number of second sub-shares needed to reconstruct the second share.

Example 8 includes the subject matter of Example 7, wherein the first threshold-based secret sharing scheme, the second threshold-based secret sharing scheme, and the third threshold-based secret sharing scheme are the same.

Example 9 includes the subject matter of Example 7, wherein the first threshold-based secret sharing scheme is different than the second threshold-based secret sharing scheme and the third threshold-based secret sharing scheme.

Example 10 includes the subject matter of Example 7, wherein the second threshold-based secret sharing scheme is different than the third threshold-based secret sharing scheme.

Example 11 includes the subject matter of any of Examples 1 through 10, wherein the first network node causes transmission of the plurality of first sub-shares to respective network nodes, such that a third network node generates a plurality of first sub-sub-shares based on a fourth secret sharing scheme applied to a first sub-share, and a fourth network node generates a plurality of second sub-sub-shares based on a fifth secret sharing scheme applied to a second sub-share, the plurality of first sub-sub-shares and second sub-sub-shares being routed downstream toward the intended recipient device.

Example 12 includes a computer program product including one or more non-transitory machine-readable mediums encoding instructions that when executed by one or more processors cause a process to be carried out for routing a message in a mesh network, the process including: receiving, at a first node of the mesh network, a share to be sent to an intended recipient device, the share being part of a message; generating, by the first node, a plurality of lower-level shares based on the share, the plurality of lower-level shares being based on a secret sharing scheme applied to the share, the secret sharing scheme indicating the number of lower-level shares generated and further indicating a reconstruction threshold that defines the number of lower-level shares needed to reconstruct the share; and causing, by the first node, transmission of the plurality of lower-level shares to other network nodes of the mesh network.

Example 13 includes the subject matter of Example 12, wherein the first secret sharing scheme is a (k, n) threshold secret sharing scheme, and n≠k.

Example 14 includes the subject matter of Example 12, wherein the first secret sharing scheme is a (k, n) threshold secret sharing scheme, and n≥2k−1.

Example 15 includes the subject matter of Example 12, wherein the first secret sharing scheme is one of a (3, 5) threshold secret sharing scheme, a (4, 6) threshold secret sharing scheme, or a (5, 7) threshold secret sharing scheme.

Example 16 includes a system to send a message. The system includes: a transmitting node including one or more processors configured to execute instructions stored on one or more non-transitory machine-readable mediums, wherein execution of the instructions causes the one or more processors to generate a message to be sent to an intended recipient device; generate a plurality of shares based on the message, each share representing a part of the message, the plurality of shares being based on a first secret sharing scheme applied to the message; and send the plurality of shares to respective network nodes, such that a first network node generates a plurality of first sub-shares based on a second secret sharing scheme applied to a first share, and a second network node generates a plurality of second sub-shares based on a third secret sharing scheme applied to a second share, the plurality of first sub-shares and second sub-shares being routed downstream toward the intended recipient device.

Example 17 includes the subject matter of Example 16, wherein the first secret sharing scheme, the second secret sharing scheme, and the third secret sharing scheme are the same.

Example 18 includes the subject matter of Examples 16 or 17, wherein each of the first secret sharing scheme, the second secret sharing scheme, and the third secret sharing scheme is a threshold-based secret sharing scheme.

Example 19 includes the subject matter of Example 18, wherein the threshold-based secret sharing scheme is a (k, n) threshold secret sharing scheme, and n≥k, k≥2, and n and k are positive integers.

Example 20 includes the subject matter of Example 16, wherein the first secret sharing scheme is different than the second secret sharing scheme and the third secret sharing scheme.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer program product including one or more non-transitory machine-readable mediums encoding instructions that when executed by one or more processors cause a process to be carried out for routing a message, the process comprising:

receiving a message to be sent to an intended recipient device;

generating a plurality of shares based on the message, each share representing part of the message, the plurality of shares being based on a first secret sharing scheme applied to the message, the first secret sharing scheme indicating the number of shares generated; and causing transmission of the plurality of shares to respective network nodes, such that a first network node generates a plurality of first sub-shares based on a second secret sharing scheme applied to a first share, and a second network node generates a plurality of second sub-shares based on a third secret sharing scheme applied to a second share, the plurality of first sub-shares and second sub-shares being routed downstream toward the intended recipient device.

2. The computer program product of claim 1, wherein the first secret sharing scheme is a (k, n) threshold secret sharing scheme.

3. The computer program product of claim 2, wherein n≥k, k≥2, and n and k are positive integers.

4. The computer program product of claim 1, wherein the first secret sharing scheme, the second secret sharing scheme, and the third secret sharing scheme are the same.

5. The computer program product of claim 1, wherein the first secret sharing scheme is different than the second secret sharing scheme and the third secret sharing scheme.

6. The computer program product of claim 1, wherein the second secret sharing scheme is different than the third secret sharing scheme.

7. The computer program product of claim 1, wherein the first secret sharing scheme is a first threshold-based secret sharing scheme and further indicates a threshold number of shares needed to reconstruct the message, the second secret sharing scheme is a second threshold-based secret sharing scheme and further indicates a threshold number of first sub-shares needed to reconstruct the first share, and the third secret sharing scheme is a third threshold-based secret sharing scheme and further indicates a threshold number of second sub-shares needed to reconstruct the second share.

8. The computer program product of claim 7, wherein the first threshold-based secret sharing scheme, the second threshold-based secret sharing scheme, and the third threshold-based secret sharing scheme are the same.

9. The computer program product of claim 7, wherein the first threshold-based secret sharing scheme is different than the second threshold-based secret sharing scheme and the third threshold-based secret sharing scheme.

10. The computer program product of claim 7, wherein the second threshold-based secret sharing scheme is different than the third threshold-based secret sharing scheme.

11. The computer program product of claim 1, wherein the first network node causes transmission of the plurality of first sub-shares to respective network nodes, such that a third network node generates a plurality of first sub-sub-shares based on a fourth secret sharing scheme applied to a first sub-share, and a fourth network node generates a plurality of second sub-sub-shares based on a fifth secret sharing scheme applied to a second sub-share, the plurality of first sub-sub-shares and second sub-sub-shares being routed downstream toward the intended recipient device.

12. A computer program product including one or more non-transitory machine-readable mediums encoding instructions that when executed by one or more processors cause a process to be carried out for routing a message in a mesh network, the process comprising:

receiving, at a first node of the mesh network, a share to be sent to an intended recipient device, the share being part of a message;

generating, by the first node, a plurality of lower-level shares based on the share, the plurality of lower-level shares being based on a secret sharing scheme applied to the share, the secret sharing scheme indicating the number of lower-level shares generated and further indicating a reconstruction threshold that defines the number of lower-level shares needed to reconstruct the share; and causing, by the first node, transmission of the plurality of lower-level shares to other network nodes of the mesh network.

13. The computer program product of claim 12, wherein the first secret sharing scheme is a (k, n) threshold secret sharing scheme, and n≠k.

14. The computer program product of claim 12, wherein the first secret sharing scheme is a (k, n) threshold secret sharing scheme, and n≥2k−1.

15. The computer program product of claim 12, wherein the first secret sharing scheme is one of a (3, 5) threshold secret sharing scheme, a (4, 6) threshold secret sharing scheme, or a (5, 7) threshold secret sharing scheme.

16. A communication system to send a message, the system comprising:

a transmitting node including one or more processors configured to execute instructions stored on one or more non-transitory machine-readable mediums, wherein execution of the instructions causes the one or more processors to generate a message to be sent to an intended recipient device;

generate a plurality of shares based on the message, each share representing a part of the message, the plurality of shares being based on a first secret sharing scheme applied to the message; and send the plurality of shares to respective network nodes, such that a first network node generates a plurality of first sub-shares based on a second secret sharing scheme applied to a first share, and a second network node generates a plurality of second sub-shares based on a third secret sharing scheme applied to a second share, the plurality of first sub-shares and second sub-shares being routed downstream toward the intended recipient device.

17. The system of claim 16, wherein the first secret sharing scheme, the second secret sharing scheme, and the third secret sharing scheme are the same.

18. The system of claim 17, wherein each of the first secret sharing scheme, the second secret sharing scheme, and the third secret sharing scheme is a threshold-based secret sharing scheme.

19. The system of claim 18, wherein the threshold-based secret sharing scheme is a (k, n) threshold secret sharing scheme, and n≥k, k≥2, and n and k are positive integers.

20. The system of claim 16, wherein the first secret sharing scheme is different than the second secret sharing scheme and the third secret sharing scheme.

* * * * *